(12) United States Patent
Meyer et al.

(10) Patent No.: US 9,638,321 B2
(45) Date of Patent: May 2, 2017

(54) METHOD FOR PRODUCING AN OIL SCRAPER PISTON RING

(71) Applicant: FEDERAL-MOGUL BURSCHEID GMBH, Burscheid (DE)

(72) Inventors: Klaus Meyer, Wermelskirchen (DE); Dirk Baerenreuter, Odenthal (DE)

(73) Assignee: FEDERAL-MOGUL BURSCHEID GMBH, Burshceid (DE)

( * ) Notice: Subject to any disclaimer, the term of this patent is extended or adjusted under 35 U.S.C. 154(b) by 21 days.

(21) Appl. No.: 14/401,946

(22) PCT Filed: Apr. 25, 2013

(86) PCT No.: PCT/DE2013/000226
§ 371 (c)(1),
(2) Date: Nov. 18, 2014

(87) PCT Pub. No.: WO2013/178204
PCT Pub. Date: Dec. 5, 2013

(65) Prior Publication Data
US 2015/0130143 A1    May 14, 2015

(30) Foreign Application Priority Data
May 31, 2012   (DE) .................. 10 2012 010 756

(51) Int. Cl.
*F16J 9/20*     (2006.01)
*F16J 9/26*     (2006.01)
*B23P 15/06*    (2006.01)

(52) U.S. Cl.
CPC ............ *F16J 9/203* (2013.01); *B23P 15/06* (2013.01); *F16J 9/20* (2013.01); *F16J 9/206* (2013.01); *F16J 9/26* (2013.01); *Y10T 29/49284* (2015.01)

(58) Field of Classification Search
CPC ...... F16J 9/20; F16J 9/203; F16J 9/206; F16J 9/26
See application file for complete search history.

(56) References Cited

U.S. PATENT DOCUMENTS 2,614,899 A  * 10/1952 Phillips ................... F16J 9/063
                                                              277/444
3,053,545 A     9/1962 Knocke
(Continued)

FOREIGN PATENT DOCUMENTS

DE       102006030881 A1    1/2008
DE    10 2010 050 598       5/2012
(Continued)

*Primary Examiner* — Nicholas L Foster
(74) *Attorney, Agent, or Firm* — Norris McLaughlin & Marcus, P.A.

(57) ABSTRACT

An oil scraper piston ring and a method for producing it in which a base body is provided with a running surface profile by machining the radially outer circumferential surface thereof, the running surface profile including two running surface lands and an interposed groove, wherein the running surface profile corresponds to that of the finished oil scraper piston ring, and on the groove side, seen in the circumferential direction, drainage holes are introduced into the groove base, at least the running surface lands are provided with a wear-resistant PVD, DLC or TaC layer and, if needed, the wear-resistant layer is subjected to a polishing, honing or lapping operation.

8 Claims, 1 Drawing Sheet

(56) References Cited

U.S. PATENT DOCUMENTS

| | | | | |
|---|---|---|---|---|
| 3,467,397 | A | * | 9/1969 | Eisuke ............... F16J 9/062 277/444 |
| 4,247,972 | A | | 2/1981 | Hendrixon et al. |
| 5,820,131 | A | * | 10/1998 | Tanaka ............... C23C 14/06 277/442 |
| 6,834,861 | B2 | * | 12/2004 | Takizawa ............ C22C 38/18 277/433 |
| 8,973,262 | B2 | * | 3/2015 | Esser ................. B23P 15/06 29/888.07 |
| 2002/0190476 | A1 | * | 12/2002 | Preyer ............... F16J 9/206 277/444 |
| 2006/0006604 | A1 | * | 1/2006 | Abe .................. F16J 9/062 277/434 |
| 2010/0176557 | A1 | * | 7/2010 | Peter-Klaus ........ F16J 9/20 277/460 |
| 2013/0049305 | A1 | | 2/2013 | Miyamoto et al. |
| 2013/0187341 | A1 | | 7/2013 | Esser et al. |
| 2014/0165826 | A1 | * | 6/2014 | Baerenreuter ....... F16J 9/062 92/172 |

FOREIGN PATENT DOCUMENTS

| | | |
|---|---|---|
| EP | 1 409 896 | 4/2004 |
| GB | 2 309 764 | 8/1997 |
| WO | WO-2008/151589 | 12/2008 |
| WO | WO-2011/132679 | 10/2011 |
| WO | WO-2012/045293 | 4/2012 |

\* cited by examiner

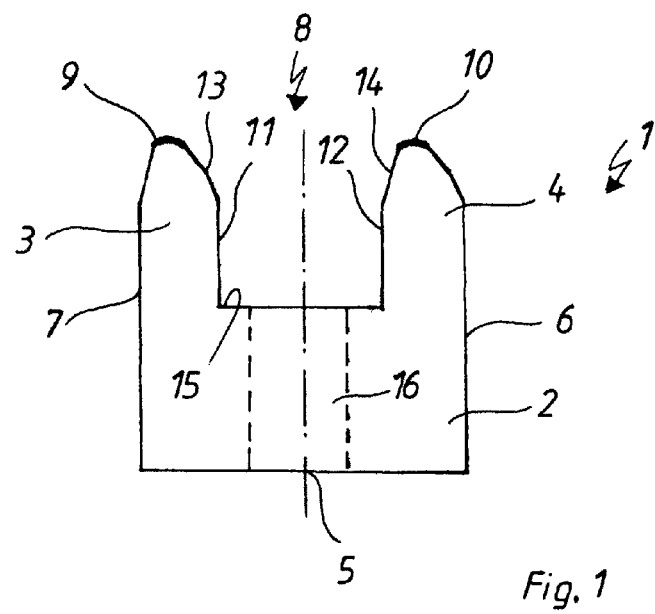
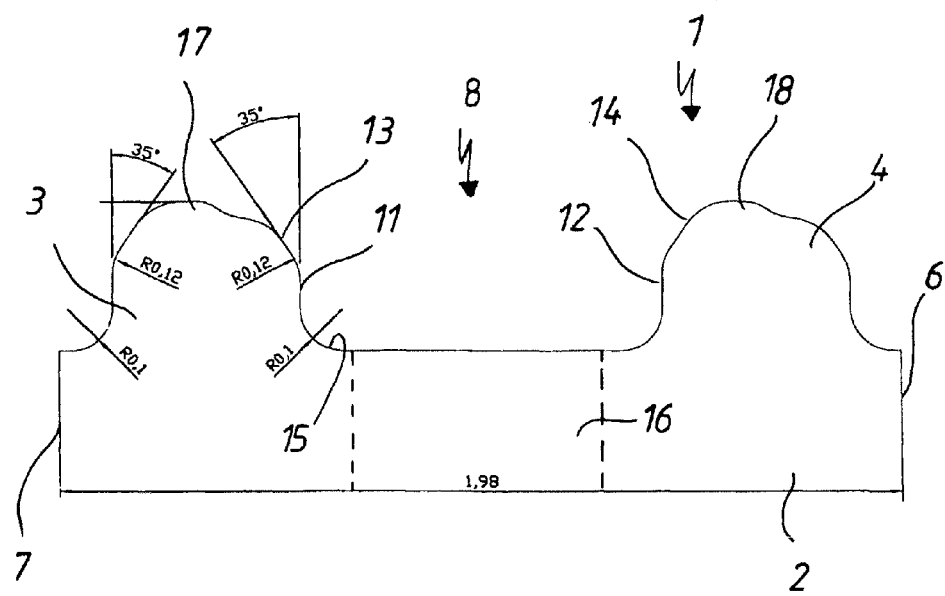

METHOD FOR PRODUCING AN OIL SCRAPER PISTON RING

BACKGROUND OF THE INVENTION

The invention relates to a method for producing an oil scraper piston ring, and to a piston ring.

Very high running surface wear on the running lands of oil scraper piston rings is observed time and again in certain engine projects. It has been found that high wear rates occur even with extremely wear-resistant running and coatings, which ultimately can only be compensated for by comparatively high layer thicknesses. Nonetheless, the ring must fulfill the requirements in terms of oil consumption and friction over the entire service life.

EP 1 409 896 B1 describes a method for producing an oil scraper piston ring, which is provided with a running land comprising a wear-resistant coating by generating, before the wear-resistant coating is applied, on the running land side, a profile which, in a conical region that forms both the outer circumferential surface and the running surface of the running land, has a radial elevation that protrudes radially outwardly from this conical ring plane, wherein at least this profile is provided with the wear-resistant coating, and wherein a predefinable amount of material is removed from the coating at least in the region of the radial elevation, so as to establish a substantially uniform running surface profile over the ring circumference.

WO 2008/151589 A1 discloses an oil scraper piston ring comprising a base body having a radially outer running surface, an inner circumferential surface, and an upper flank and a lower flank, the ring having at least two running surface lands, which are provided with a wear-resistant layer, if needed, and which, proceeding from the base body, are conically tapered at a predefinable angle, forming limbs, radially in the direction of the ends thereof facing a counter running surface and, proceeding from an oil chamber-side region, the free ends of the running surface lands being designed to be slanted in the direction of a combustion chamber-side region, wherein the respective transition regions from the slanted region of the running surface land into the limbs on the one hand, and from the limbs into the base body on the other hand, are rounded, which is to say provided with defined radii.

The running surface contour is a radius in this embodiment. The width of the bearing contact surface of the lands thus increases quickly as wear increases, resulting in increased oil consumption after a certain operating time.

SUMMARY OF THE INVENTION

It is the object of the invention to provide a method for producing an oil scraper piston ring, with which the piston ring is easy to produce and can be provided with a hard, wear-resistant layer. Subsequent working of the finished ring is to be essentially unnecessary.

It is a further object of the invention to provide a novel piston ring design, which allows the requirements in terms oil consumption and friction to be optimized, seen over the entire service life of the piston ring.

This object is achieved by a method for producing an oil scraper piston ring in which a base body is provided with a running surface profile by machining the radially outer circumferential surface thereof, the running surface profile including two running surface lands and an interposed groove, wherein the running surface profile corresponds to that of the finished oil scraper piston ring, and on the groove side, seen in the circumferential direction, drainage holes are introduced into the groove base, at least the running surface lands are provided with a wear-resistant PVD, DLC or TaC layer, and, if needed, the wear-resistant layer is subjected to a polishing, honing or lapping operation. The machining of the base body may be by means of a lathe and, in preferred embodiments of the invention, the machining forms mutually facing running land flanks that extend substantially parallel to each other.

In an oil scraper ring, and a method for producing an oil scraper piston ring in which a base body is provided with a running surface profile by machining the radially outer circumferential surface thereof, the running surface profile including two running surface lands and an interposed groove (8), this object is also achieved in that the running surface profile corresponds to that of the finished oil scraper piston ring, and on the groove side, seen in the circumferential direction, drainage holes are introduced into the groove base, at least the running surface lands are provided with a wear-resistant PVD, DLC or TaC layer and, if needed, the wear-resistant layer is subjected to a polishing, honing or lapping operation.

As a result of the method according to the invention, it is now possible to provide a base body, by way of machining, in such a way that it corresponds to the profile of the finished oil scraper piston ring. Hard, wear-resistant layers using PVD, DLC or TaC are almost impossible to process after application, and thus the subject matter of the invention can optimize the work flow.

This applies in particular to axially low, i.e., thin, oil scraper piston rings. Due to the special groove contour, drainage holes can now also be introduced into axially thin oil scraper piston rings.

In a special embodiment of the subject matter of the invention, the running land flanks extend parallel to each other, wherein the parallel running and flanks approach the base of the groove forming a radius.

Similarly, the transition of the running land flanks, which in particular extend parallel to each other, into the respective tapered section of the associated running surface land, can take place via a curved region, in particular a radius.

It is advantageous for the tapered section to extend at an angle between 20 and 40° with respect to the parallel and flanks.

Similarly to the related art, if needed, the running surface lands can be provided with a predefinable outer profile, in particular a protuberance profile, to which a wear-resistant coating having a predefinable layer thickness is applied. In this process, a larger running edge radius and a flatter angle of the running land flanks can be established, depending on the respective coating thickness and coating type. Running edge radii between 0.05 and 0.25 mm can be introduced into the respective running surface land, again depending on the coating thickness and coating type.

By virtue of the subject matter of the invention, the lands can optionally be implemented as narrow as in the related art, despite an increased layer thickness that may be required in some instances. This allows particularly axially thin oil scraper piston rings to be produced.

As was already discussed above, the running surface lands are provided with a hard, wear-resistant coating, which advantageously is designed as a PVD, DLC or TaC layer. The terms PVD, DLC and TaC denote physical vapor deposition, diamond-like carbon, and tantalum carbide.

As a function of the particular use, layer thicknesses between 10 and 50 µm can be applied to the running surface lands.

The subject matter of the invention makes it possible to implement the axial thickness of the base body and, hence, of the finished oil scraper ring, at ≤2.5 mm, and more particularly ≤2 mm.

It is also particularly advantageous that the proposed groove profile forms such a wide groove base that drainage holes having sufficient diameters can be introduced into the groove base even in axially low base bodies.

The subject matter of the invention is shown in the drawings based on an exemplary embodiment and is described as follows. In the drawings:

BRIEF DESCRIPTION OF THE DRAWINGS

FIG. 1 shows a schematic diagram of a piston ring according to the invention; and FIG. 2 shows the configuration of the running surface of a piston ring according to the invention.

DETAILED DESCRIPTION OF THE INVENTION

FIG. 1 shows a schematic diagram of a piston ring 1 according to the invention, designed as an oil scraper piston ring, comprising a base body 2, which has two radially outer running surface lands 3, 4, a radially inner circumferential surface 5, an upper flank region 6, and a lower flank region 7. The running surface lands 3, 4 are integrally formed on the base body 2 at a predefinable axial distance from each other, forming a groove 8. In this example, the running surface lands 3, 4 are provided with a coating 9, 10 in the region of a counter running surface, which is not shown in greater detail and is formed by a cylinder wall, for example. Unlike the related art, the running land flanks 11, 12 extend substantially parallel to the flank regions 6, 7. A conical, i.e., tapered, section 13, 14 extends between the free ends of the running surface lands 3, 4 and the end region of the running land flanks 11, 12, the running land flanks extending parallel to each other. In the region of the groove profile generated by the cross-sectional shape according to the invention, it is possible to introduce drainage holes 16 without difficulty into the region of the groove base 15. This would be difficult if the section 13, 14 were to conically approach the groove base 15 directly, as was customary.

FIG. 2 shows a schematic diagram of a running surface configuration of a piston ring 1 according to the invention designed as an oil scraper piston ring similar to that of WO 2008/151589 A1 but with differences from the prior art, including that the running flanks extend substantially parallel to the flank regions 6, 7 and drainage holes 16 are introduced into the region of the groove base 15. Identical components are denoted by identical reference numerals in FIGS. 1 and 2.

The base body 2 of the piston ring 1 is provided with a groove 8, which is designed similarly to FIG. 1. Again, proceeding from the groove base 15, running land flanks 11, 12 that extend substantially parallel to the flank regions 6, 7 are provided, so that the width on the groove base side is relatively large so as to accommodate accordingly large drainage holes 16 in the base body 2. In this example, the mutually parallel running land flanks 11, 12 merge into the groove base 15 by way of a radius R 0.1. Analogously to FIG. 1, a conical section 13, 14 that reduces the running land width is again provided, wherein the transition region from the mutually parallel running land flanks 11, 12 into the sections 13, 14 also takes place by way of radii. In this example, the running surface lands 3, 4 are provided with a protuberance profile 17, 18, wherein, analogously to FIG. 1, a corresponding coating (not shown here) can be applied to the respective running surface land 3, 4.

The invention claimed is:

1. An oil scraper piston ring, comprising:
a base body having a radially outer running surface comprised by two axially spaced running surface lands, an inner circumferential surface, and respective upper and lower flanks extending radially from the inner circumferential surface to the radially outer running surface, a groove base and running surface land flanks constituting a groove in the radially outer running surface, wherein from proximate the groove base, the running surface land flanks extend substantially parallel to the upper and lower flanks and to each other and up to a predetermined radial height above the groove base, at said predetermined radial height above the groove base a section of each of the running surface lands comprises a protuberance at a free end of the respective running surface land, an at least substantially conical section of each protuberance is angled at 20 to 40° with respect to the running surface land flanks thereby to taper a radial dimension of each running surface land toward the free end of the running surface land so that each of the running surface lands is narrowest at the free end thereof, and a wear resistant coating having a layer thickness between 10 and 50 um is provided on each of the protuberances, wherein an axial thickness of the base body is <2.5 mm,
wherein each of the respective running surface land flanks transition into a respective one of the protuberances via a radius and each radius is directly connected to a respective one of the at least substantially conical sections of each protuberance, and
wherein each of the running surface lands also comprises an outer running surface land flank, each outer running surface land flank extending from proximate a respective one of the upper and lower flanks to proximate a respective one of the protuberances, each outer running surface land flank transitions into the respective one of the protuberances via an outer radius and each outer radius is directly connected to a respective at least substantially conical outer section of the respective one of the protuberances which is angled at 20 to 40° with respect to the outer running surface land flanks.

2. The oil scraper piston ring according to claim 1, wherein the running surface land flanks each transition into the groove base via an additional radius.

3. The oil scraper piston ring according to claim 1, wherein the coating is a PVD, DLC or TaC layer.

4. The oil scraper piston ring according to claim 2, wherein the center of curvature of each additional radius is located between the running surface land flanks.

5. The oil scraper piston ring according to claim 1, wherein the center of curvature of each radius is located inside a respective running surface land.

6. The oil scraper piston ring according to claim 1, wherein an outermost surface of each coating comprises a PVD, DLC or TaC layer.

7. The oil scraper piston ring according to claim 1, wherein each coating comprises a DLC or TaC layer.

8. The oil scraper piston ring according to claim 1, wherein each coating has been subjected to polishing, honing, or lapping.

* * * * *